US011250265B2

(12) United States Patent
Du et al.

(10) Patent No.: US 11,250,265 B2
(45) Date of Patent: Feb. 15, 2022

(54) IMAGE PROCESSING METHOD AND APPARATUS, ELECTRONIC DEVICE, READABLE STORAGE MEDIUM

(71) Applicant: BEIJING XIAOMI MOBILE SOFTWARE CO., LTD., Beijing (CN)

(72) Inventors: Xirui Du, Beijing (CN); Junzeng Du, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 109 days.

(21) Appl. No.: 16/699,413

(22) Filed: Nov. 29, 2019

(65) Prior Publication Data
US 2021/0004595 A1 Jan. 7, 2021

(30) Foreign Application Priority Data
Jul. 1, 2019 (CN) .......................... 201910586875.7

(51) Int. Cl.
G06K 9/00 (2006.01)
H04N 5/232 (2006.01)
G06T 11/60 (2006.01)
H04N 5/235 (2006.01)

(52) U.S. Cl.
CPC .......... *G06K 9/00671* (2013.01); *G06T 11/60* (2013.01); *H04N 5/2351* (2013.01); *H04N 5/23218* (2018.08); *H04N 5/23222* (2013.01)

(58) Field of Classification Search
CPC ........... G06K 9/00671; H04N 5/23218; H04N 5/23222; H04N 5/2351; G06T 11/60
See application file for complete search history.

(56) References Cited

U.S. PATENT DOCUMENTS

2008/0159628 A1 7/2008 Yoshida
2009/0129637 A1 5/2009 Tanaka et al.
2009/0135269 A1* 5/2009 Nozaki .............. H04N 5/23219
348/222.1

(Continued)

FOREIGN PATENT DOCUMENTS

CN 108924412 A 11/2018
CN 108989665 A 12/2018
CN 109697746 A 4/2019

OTHER PUBLICATIONS

Extended European Search Report for EP Application No. 19217640.2 dated Dec. 11, 2020.

*Primary Examiner* — Xin Sheng
(74) *Attorney, Agent, or Firm* — Syncoda LLC; Feng Ma

(57) ABSTRACT

An image processing method includes: determining a current orientation of a target object; judging whether the current orientation satisfies a set condition; if satisfied, controlling a display screen of the device to display a prompt message to prompt the object to adjust the current orientation to not satisfy the condition; if not satisfied, adjusting a display parameter of a viewing frame to indicate that photographing is allowed; loading the target virtual image to a region where the viewing frame is located, in response to a photographing button being triggered, to acquire a target image after a portion of the object in the viewing frame has been replaced by a target virtual image. A photographer can therefore be guided by the current orientation to photograph correctly, thereby improving photographing quality and experience.

11 Claims, 14 Drawing Sheets

(56) References Cited

U.S. PATENT DOCUMENTS

| | | | |
|---|---|---|---|
| 2014/0204260 A1* | 7/2014 | Ha | H04N 5/23293 348/333.01 |
| 2015/0320509 A1* | 11/2015 | Wei | A61B 34/10 600/424 |
| 2016/0314366 A1* | 10/2016 | Omi | H04N 5/23229 |
| 2016/0321833 A1* | 11/2016 | Chong | G06T 13/80 |
| 2017/0094132 A1* | 3/2017 | Miyata | H04N 5/2252 |
| 2018/0075289 A1 | 3/2018 | Zhang et al. | |

* cited by examiner

| acquiring an angle included between a plane where a specified location on the target object is located and a plane where the display screen on the electronic device is located | 601 |

| determining that the current orientation satisfies the condition that the object is deflected to left, if the angle is less than a minimum value of a preset angle range; determining that the current orientation satisfies the set condition that the object is deflected to right, if the angle is greater than a maximum value of the preset angle range; determining that the current orientation does not satisfy the set condition, if the angle is within the angle range | 602 |

FIG. 6

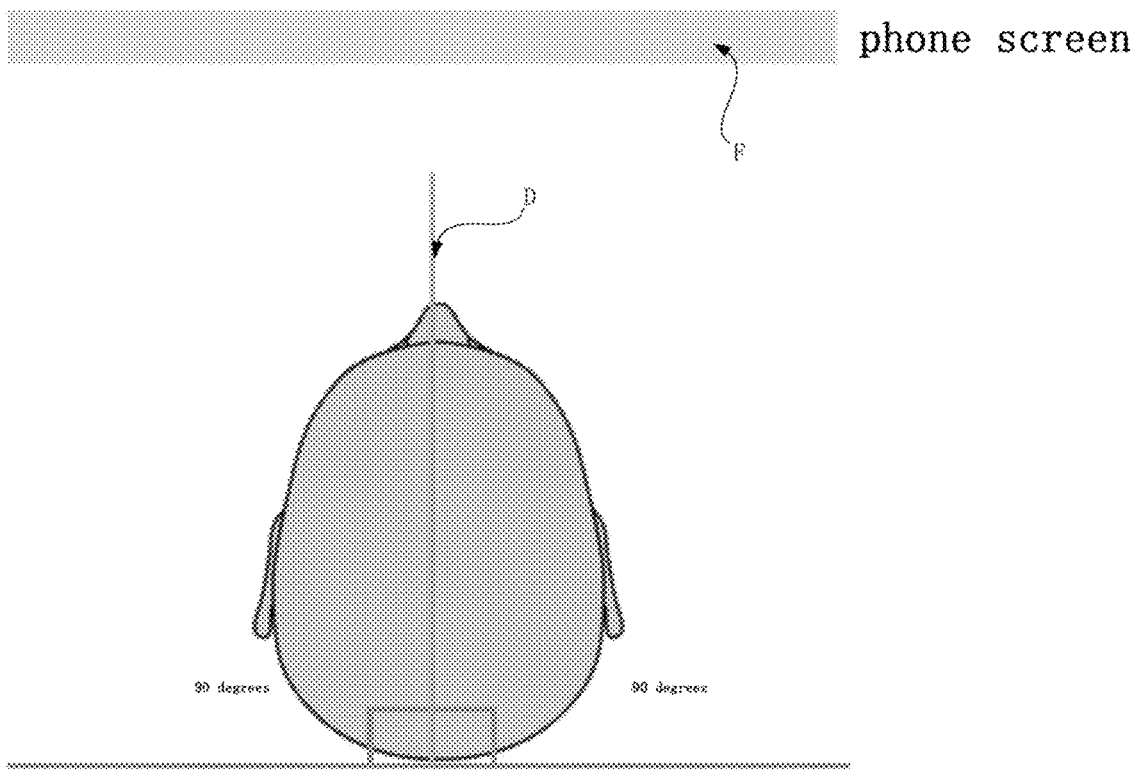

FIG. 7A phone screen

IMAGE PROCESSING METHOD AND APPARATUS, ELECTRONIC DEVICE, READABLE STORAGE MEDIUM

CROSS-REFERENCE TO RELATED APPLICATION

This application claims priority to Chinese Patent Application No. 201910586875.7 filed on Jul. 1, 2019, the disclosure of which is hereby incorporated by reference in its entirety.

BACKGROUND

At present, a camera is provided in most of electronic devices, and a user can perform photographing at anytime and anywhere through the camera. A method of photographing is provided in the related arts, wherein the user performs photographing according to a specific scene after a photographing function is turned on.

SUMMARY

The present disclosure is directed to provide an image processing method and apparatus, an electronic device, and a readable storage medium to solve shortages of the related arts.

According to a first aspect of the embodiments of the present disclosure, there is provided an image processing method, which is applicable to an electronic device, the method includes:

determining a current orientation of a target object in response to the target object entering a viewing frame of the electronic device;

judging whether the current orientation satisfies a set condition that a target orientation does not satisfy a photographing requirement;

controlling a display screen of the electronic device to display a prompt message if the current orientation satisfies the set condition, wherein the prompt message is used to prompt the target object to adjust the current orientation, so that the adjusted orientation does not satisfy the set condition;

adjusting a display parameter of the viewing frame if the current orientation does not satisfy the set condition, wherein the adjusted display parameter is used to indicate that photographing is allowed; and loading a target virtual image to a region where the viewing frame is located in response to a photographing button on the electronic device being triggered, so as to acquire a target image after a portion of the target object located in the viewing frame has been replaced by the target virtual image.

According to a second aspect of the embodiments of the present disclosure, there is provided an image processing apparatus, which is applicable to an electronic device, the apparatus comprises:

a current orientation determining circuit, configured to determine a current orientation of a target object in response to the target object entering a viewing frame of the electronic device;

a current orientation judging circuit, configured to judge whether the current orientation satisfies a set condition that the target orientation does not satisfy a photographing requirement;

a set condition determining circuit, configured to control a display screen of the electronic device to display a prompt message when the current orientation satisfies the set condition, wherein the prompt message is used to prompt the target object to adjust the current orientation, so that the adjusted orientation does not satisfy the set condition; and configured to adjust a display parameter of the viewing frame when the current orientation does not satisfy the set condition, wherein the adjusted display parameter is used to indicate that photographing is allowed; and a virtual image loading circuit, configured to load a target virtual image to a region where the viewing frame is located in response to a photographing button on the electronic device being triggered, so as to acquire a target image after a portion of the target object located in the viewing frame has been replaced by the target virtual image.

Preferably, the set condition comprises: a distance is less than a first distance threshold or a distance is greater than a second distance threshold; the current orientation judging circuit comprises:

a region acquiring subcircuit, configured to acquire a first region where a specified part of the target object is located and a second region where the viewing frame is located;

an overlapped region acquiring subcircuit, configured to acquire an overlapped region of the first region and the second region;

an area acquiring subcircuit, configured to acquire a first area of the overlapped region and a second area of the second region;

a ratio acquiring subcircuit, configured to acquire a ratio of the first area to the second area; and an orientation determining subcircuit, configured to determine that the current orientation of the target object satisfies the set condition that the distance is greater than the second distance threshold when the ratio is greater than the maximum value of the preset ratio range; to determine that the current orientation of the target object satisfies the distance is less than the first distance threshold when the ratio is smaller than the minimum value of the ratio range; and configured to determine that the current orientation does not satisfy the set condition when the ratio is within the ratio range.

Preferably, the set condition comprises: number of objects exceeds a threshold, and the current orientation judging circuit comprises:

a number acquiring subcircuit, configured to acquire the number of target objects in the viewing frame; and an orientation determining subcircuit, configured to determine that the current orientation satisfies the set condition when the number is greater than a preset number threshold; and configured to determine that the current orientation does not satisfy the set condition when the number is less than or equal to the number threshold.

Preferably, the set condition comprises: object is deflected to left or object is deflected to right, and the current orientation judging circuit comprises:

an angle acquiring subcircuit, configured to acquire an angle included between a plane where a specified portion on the target object is located and a plane where the display screen on the electronic device is located; and an orientation determining subcircuit, configured to determine that the current orientation satisfies the set condition that the object is deflected to left when the angle is less than a minimum value of a preset angle range; to determine that the current orientation satisfies the set condition that the object is deflected to right when the angle is greater than a maximum value of the preset angle range; and configured to determine that the current orientation does not satisfy the set condition if the angle is within the angle range.

According to a third aspect of the embodiments of the present disclosure, there is provided an electronic device, comprising:

a processor;

a memory for storing instructions executable by the processor;

wherein the processor is configured to execute the instructions in the memory to implement steps of the method of the first aspect.

According to a fourth aspect of an embodiment of the present disclosure, there is provided a readable storage medium having stored therein computer programs which, when executed by a processor, implement steps of the method of the first aspect.

It should be understood that the above general description and the following detailed description are exemplary and explanatory, and should not limit the present disclosure.

BRIEF DESCRIPTION OF THE DRAWINGS

The accompanying drawings, which are incorporated in and constitute a part of this disclosure, illustrate embodiments consistent with the disclosure and, together with the description, serve to explain the principles of the disclosure, wherein:

FIG. 6 is a schematic flow chart showing still another process of judging whether a current orientation satisfies a set condition according to some embodiments;

FIG. 7A is a first diagram showing another application scene according to some embodiments;

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Various embodiments of the present disclosure can address that there is often no guidance for the user's photographing process, where quality of a photographed picture cannot be guaranteed.

Figure 1:
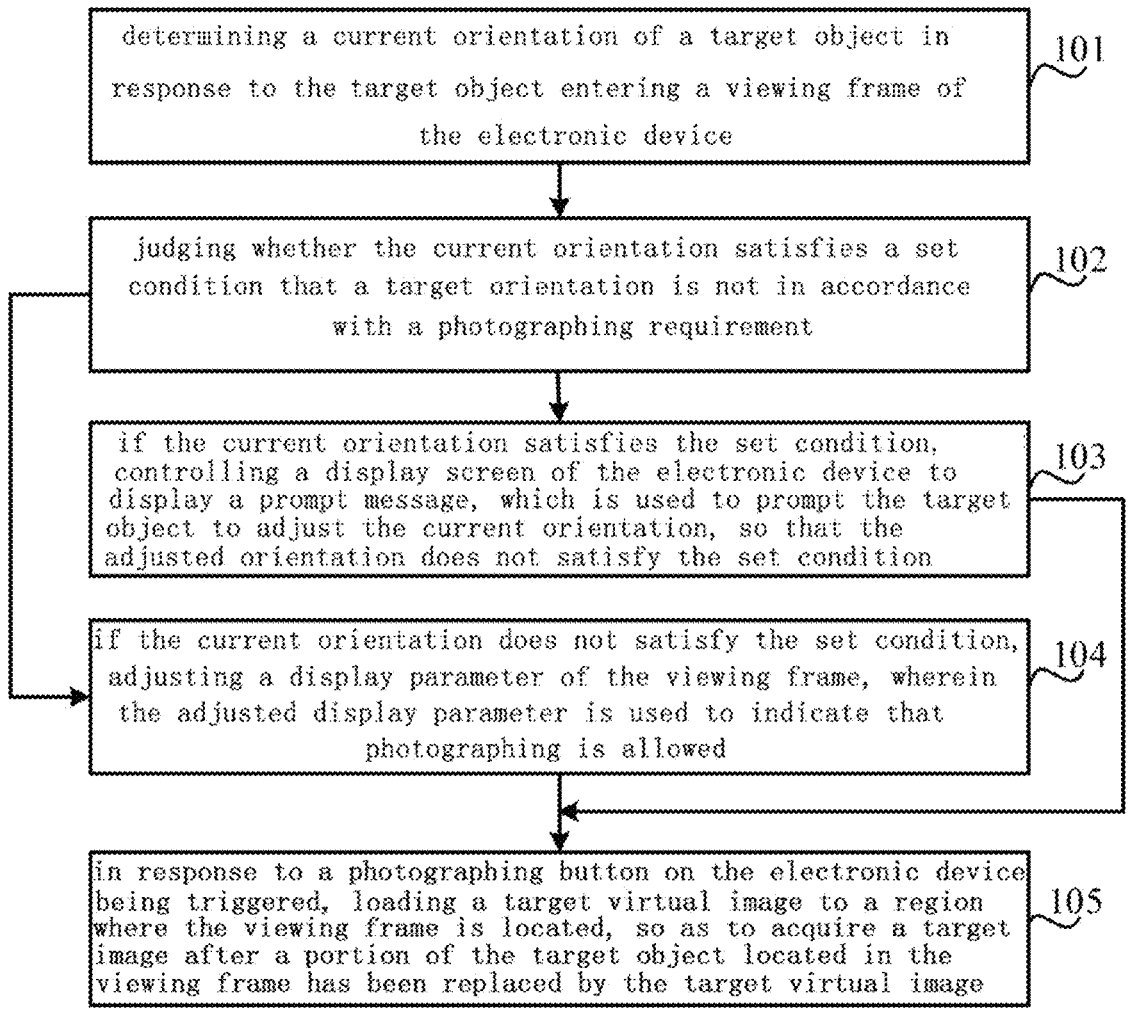
FIG. 1 is a schematic flow chart showing an image processing method according to some embodiments.

FIG. 1 is a schematic flow chart showing an image processing method according to some embodiments, which may be applicable to an electronic device, wherein the electronic device may include a smart phone, a tablet, a camera, a server, and the like. Referring to FIG. 1, an image processing method comprises steps 101 to 103, wherein:

in step 101, determining a current orientation of a target object in response to the target object entering a viewing frame of the electronic device; and in step 102, judging whether the current orientation satisfies a set condition that a target orientation does not satisfy a photographing requirement.

In this embodiment, a camera is disposed on the electronic device, and is able to start photographing in response to a turning-on operation of a user. After being turned on, the electronic device may display a preset viewing frame on a display screen thereon so that a target object may be taken into the viewing frame. The target object may be a person, a pet, or the like.

It should be noted that, taking a smart phone as an example of the electronic device, the smart phone may include two cameras, that is, a front camera and a rear camera. When the front camera is turned on, the target object may be the user himself/herself handholding the smart phone, that is, the target object is a photographer. When the rear camera is turned on, the target object may be a user other than the user handholding the smart phone, that is, the target object is a person other than the photographer.

The orientation can include, for example, a posture, position, attitude angle, etc., of the target object.

It should be further noted that detecting a target object entering the viewing frame can be implemented by calling a target tracking algorithm or a face recognition algorithm in the related arts, corresponding solutions of which fall within the protection scope of the present application as long as that the target object is able to be detected.

In this embodiment of the electronic device, a set condition indicating that a photographing requirement is satisfied may be preset. The photographing requirement comprises: 1. a shutter, an aperture, ISO and so on of the camera meet the photographing requirement during photographing. 2. A specified portion of the target object (such as a face) can be recognized, a distance from the camera is within a preset distance range, and a deflection angle is within a preset angular range during the photographing. It can be understood that the set condition may be adjusted according to a specific scene, which is not limited herein. In combination with the above, the set conditions dissatisfying the photographing requirement may comprise one of the following: a target object cannot be identified, a distance is less than a first distance threshold, a distance is greater than a second distance threshold, number of the target objects exceeds a number threshold, a target object is deflected to left, a target object is deflected to right, and brightness is lower or higher.

After determining that the target object has entered the viewing frame, the electronic device may determine a current orientation of the target object. Then, the electronic device may judge whether the current orientation satisfies the set condition.

Figure 2:
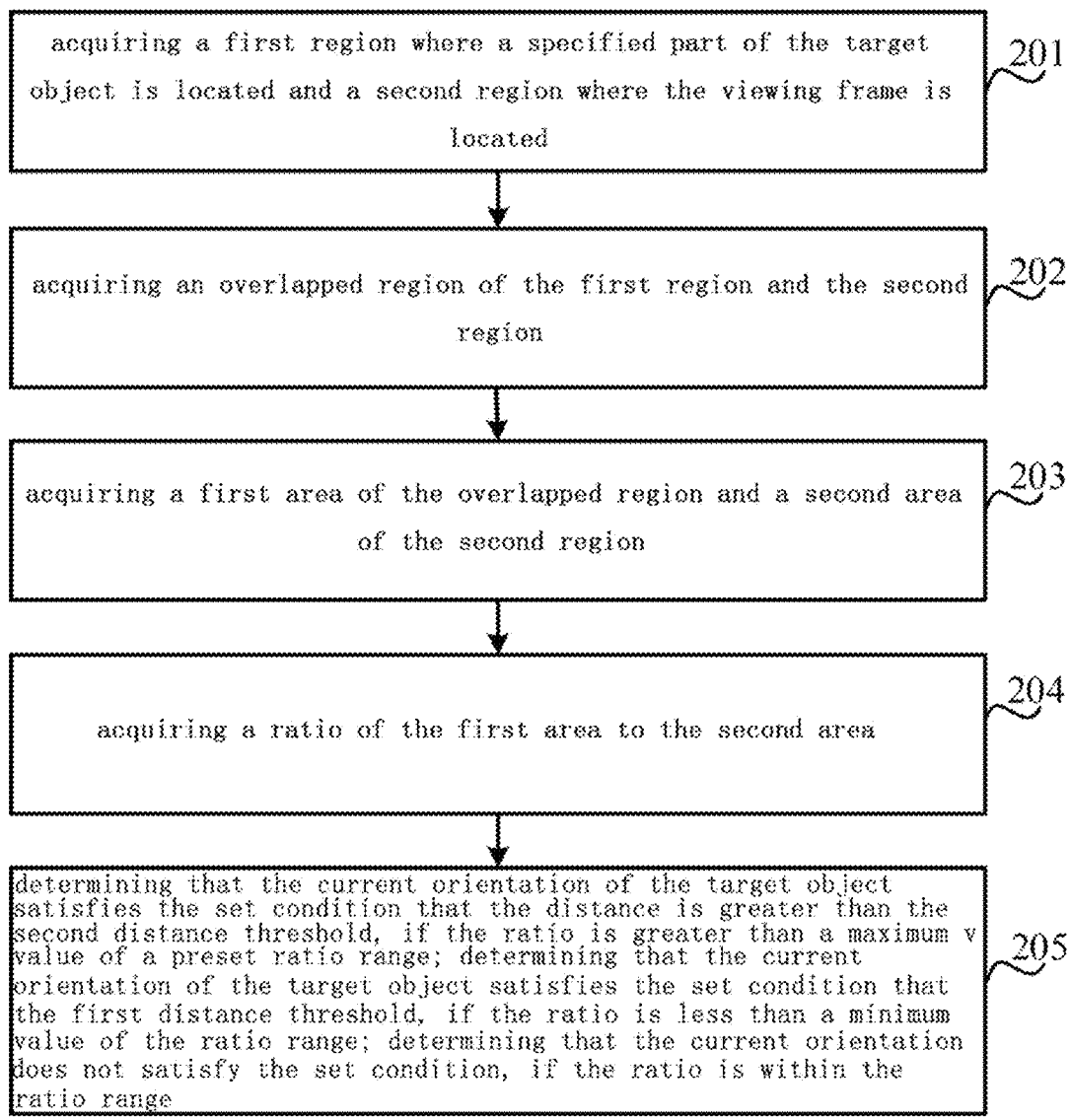
FIG. 2 is a schematic flow chart showing a process of judging whether a current orientation satisfies a set condition according to some embodiments.

In an example, the set condition comprises that the distance is smaller than the first distance threshold or the distance is greater than the second distance threshold, wherein the distance smaller than the first distance threshold means that the target object is relatively close to the camera of the electronic device, and a distance therebetween is smaller than the set first distance threshold, and wherein the distance greater than the second distance threshold means that the target object is relatively far from the camera of the electronic device. In order to acquire the distance between the target object and the camera in a better way, in this embodiment, whether the distance is far from or close to the camera may be characterized by size of an overlapped region of a region where the target object is located and a region where the viewing frame is located in the display interface. That is, whether the distance is greater than the second distance threshold or less than the first distance threshold may be judged according to a ratio of an area of the overlapped region and an area of the region where the viewing frame is located, and a range of the ratio. Referring to FIG. 2, the step of the electronic device acquiring the current orientation comprises: acquiring a first region where a specified portion of the target object is located and a second region where the viewing frame is located (corresponding to step 201 in FIG. 2). The specified portion may be the face of the target object, and may be set by a technician according to a specific scene. For example, in following embodiments, if a target virtual image is a cartoon object, the specified portion may be a face, and if the target virtual image is a glove, the specified portion may the palm of the object, corresponding solutions of which fall within the protection scope of this application.

Then, the electronic device may acquire an overlapped region of the first region and the second region (corresponding to step 202 in FIG. 2). Thereafter, the electronic device may acquire a first area of the overlapped region and a second area of the second region (corresponding to step 203 in FIG. 2). Further, the electronic device may acquire a ratio of the first area to the second area (corresponding to step 204 in FIG. 2). Finally, the electronic device may determine that the current orientation satisfies the distance of the target object being greater than the second distance threshold when the ratio is greater than a maximum value of a preset ratio range; the electronic device may determine that the current orientation of the target object satisfies the distance being less than the first distance threshold when the ratio is smaller than a minimum value of the ratio range; and the electronic device may determine that the current orientation does not satisfy the set condition when the ratio is within the ratio range (corresponding to step 205 in FIG. 2).

Figure 3:
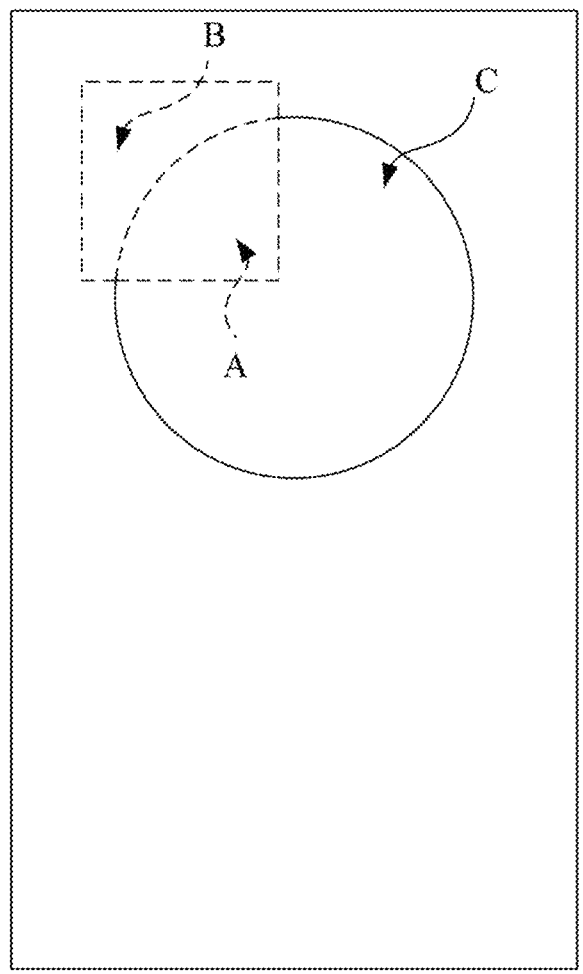
FIG. 3 is a diagram showing an application scene according to some embodiments.

For example, referring to FIG. 3, a rectangle in FIG. 3 is a display interface of the electronic device. A viewing frame, that is, a circle in the display interface, is located in the second area C. A target object, that is, a square B in the viewing frame, is located in the first area B. A region where a first area B and a second area C are overlapped is an overlapped region A. The electronic device may acquire a first area AA of the overlapped region A and a second area CC of the second region C, and then calculate a ratio E of the first area AA and the second area CC, namely:

$$E=AA/CC*100\%$$

In this example, the ratio range can be preset as [20%, 75%]. The electronic device may acquire the ratio range from the local or the cloud and then compare the ratio E to the ratio range. If the ratio E is less than 20% (i.e. [0, 20%)), the electronic device may determine that the current orientation of the target object satisfies the condition that the distance is less than the first distance threshold. If the ratio E is greater than 75% (i.e. (75%, 100]), the electronic device may determine that the current orientation of the target object satisfies the condition that the distance is greater than the second distance threshold. If the ratio E is greater than or equal to 20% and less than or equal to 75% (i.e. [20%, 75%]), the electronic device may determine that the current orientation of the target object does not satisfy the set condition.

Figure 4:
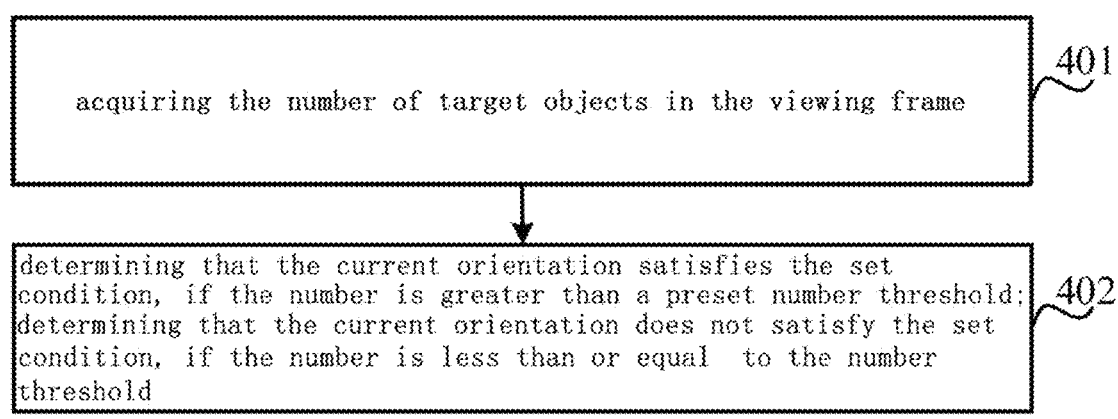
FIG. 4 is a schematic flow chart showing another process of judging whether a current orientation satisfies a set condition according to some embodiments.

In another example, the set condition comprises the number of target objects exceeds a threshold. Referring to FIG. 4, the electronic device acquiring the current orientation comprises: the electronic device may acquire the number of target objects in the viewing frame (corresponding to step 401 in FIG. 4). Then, the electronic device may compare the number of target objects with a preset number threshold. If the number is greater than the preset number threshold, the electronic device determines that the current orientation satisfies the set condition. If the number is less than or equal to the number threshold, the electronic device determines that the current orientation does not satisfy the set condition (corresponding to step 402 in FIG. 4).

Figure 5A:
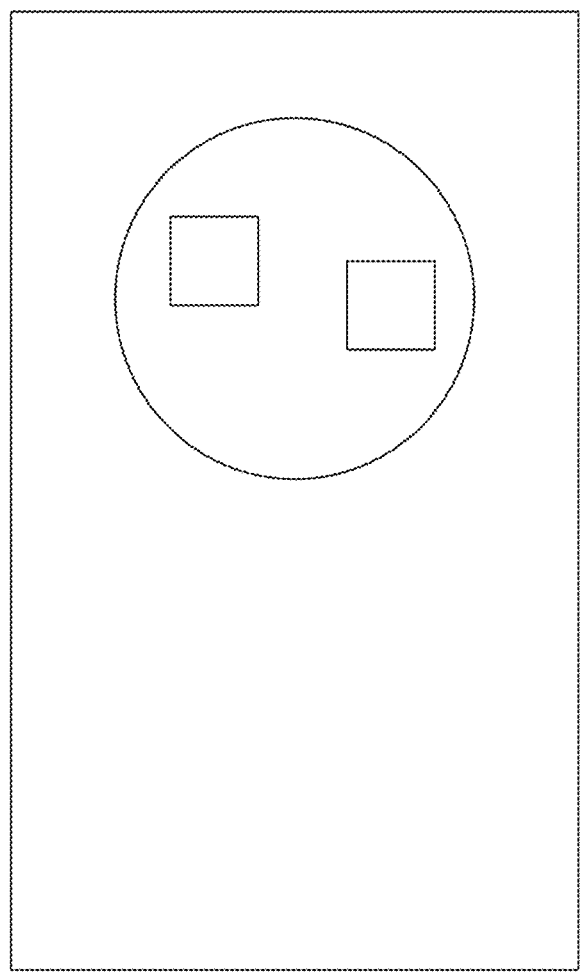
FIG. 5A is a first diagram showing another application scene according to some embodiments.
Figure 5B:
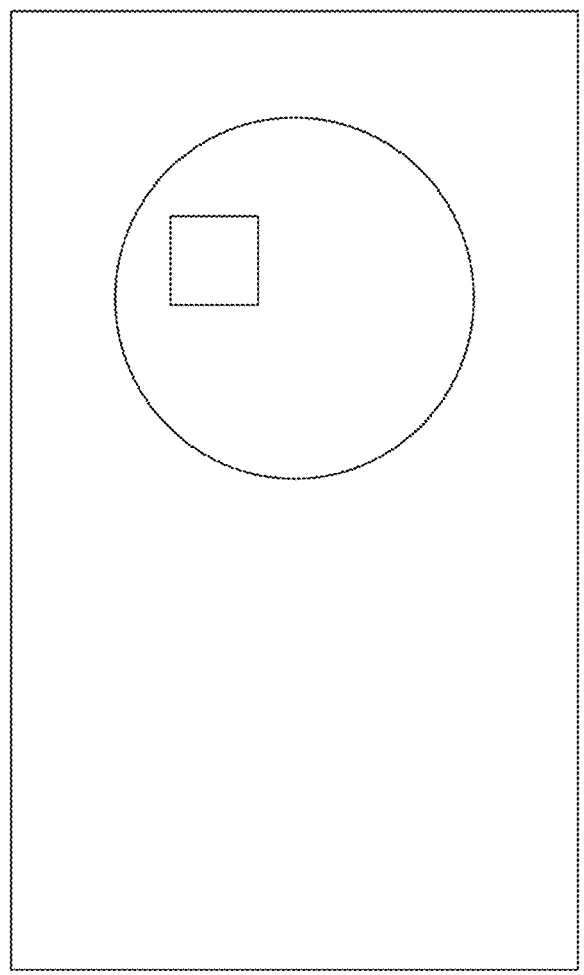
FIG. 5B is a second diagram showing another application scene according to some embodiments.

For example, referring to FIG. 5A, the electronic device may acquire that the number of target objects (i.e. squares) in the viewing frame (i.e. the circle) is 2. If the number threshold is 1, the electronic device can determine that the number of target objects is greater than the threshold. Therefore, the electronic device can determine that the current orientation of the target object satisfies the set condition. Referring to FIG. 5B, the number of target objects is 1, and the electronic device can determine that the number of target objects is equal to (or less than) the number threshold, and therefore the electronic device can determine that the target object does not satisfy the condition that the number of objects exceeds the threshold.

In another example, the set condition comprises the object is deflected to left or the object is deflected to right. Referring to FIG. 6, the electronic device acquiring the current orientation comprises: the electronic device may acquire an angle included between a plane where a specified portion on the target object is located and a plane where the display screen on the electronic device is located (corresponding to step 601 in FIG. 6). The specified portion may comprise three points, such as a tip of the nose, a midpoint between the two eyes, and a midpoint between the two ears, which can be set by a technician according to a specific scene, and is not limited herein. Then, when the angle is smaller than a minimum value of a preset angle range, the electronic device may determine that the current orientation satisfies the condition that the object is deflected to left; when the angle is greater than a maximum value of the preset angle range, the electronic device may determine that the current orientation satisfies the condition that the object is deflected to right. If the angle is within the angle range, the electronic device may determine that the current orientation does not satisfy the set condition (corresponding to step 602 in FIG. 6).

Figure 7B:
FIG. 7B is a second diagram showing another application scene according to some embodiments.

For example, referring to FIG. 7A, with a plane D where the tip of the nose, the midpoint between two ears, and a cusp of the posterior head are located, the electronic device may then calculate an angle between the plane D and the plane F of the display screen. Under normal conditions, the angle should be 90 degrees. Referring to FIG. 7B, as the target object turns to left or to right so that the angle exceeds the preset range [−20°,+20° ], for example, if the angle is less than −20 degrees, the electronic device may determine that the object is deflected to left, and if the angle is greater than 20 degrees, the electronic device may determine that the object is deflected to right.

Figure 8:
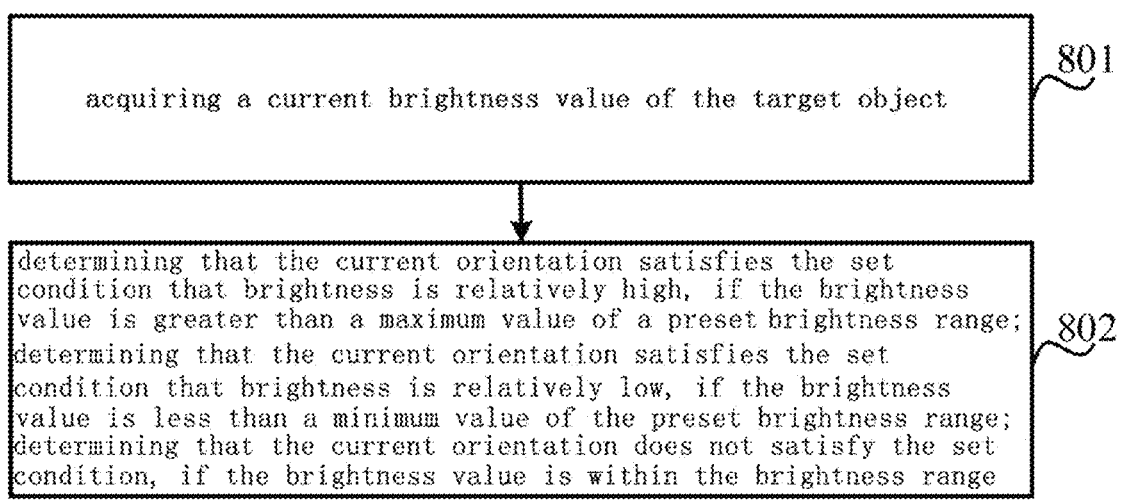
FIG. 8 is a schematic flow chart of still another process of judging whether a current orientation satisfies a set condition according to some embodiments.

In another example, the set condition comprises that brightness is relatively low or high. Referring to FIG. 8, the electronic device acquiring the current orientation comprises: the electronic device may acquire a current brightness value of the target object (corresponding to step 801 in FIG. 8). The brightness value may be acquired by a brightness sensor on the electronic device, or may be acquired by calculation of a processor in the electronic device according to a brightness of an acquired image, corresponding solutions of which fall into the protection scope of the present application as long as the current brightness value of the target object can be acquired. Then, the electronic device may determine that the current orientation satisfies the condition that the brightness is relatively high, when the brightness value of the electronic device is greater than a maximum value of the preset brightness range. The electronic device may determine the current gesture satisfies the condition that the brightness is relatively low, when the brightness value is less than a minimum value of the preset brightness range. If the brightness value is within the brightness range, the electronic device may determine that the current orientation does not satisfy the set condition (corresponding to step 802 in FIG. 8).

In another example, the electronic device may recognize the target object by calling a target tracking algorithm or a face recognition algorithm and so on. If there is no result for the recognition, it can be determined that the current orientation of the target object satisfies the unrecognizable target object, and thereby satisfies the set condition. If there is a result for the recognition, it can be continued to verify others in the set conditions.

In practice, the electronic device may check all the set conditions before determining that the current orientation does not satisfy the set condition. Alternatively, the electronic device may first check all the set conditions in the early stage before determining frequently occurring problems of the target object in the set condition according to big data statistics or in a deep learning manner. Based on the frequently occurring problems, corresponding partial conditions in the set conditions are determined as preferred conditions to be checked. Then it can be determined that current orientation does not satisfy the set condition after these preferred conditions being checked, thereby reducing quantity of data calculation. Of course, conditions and the number thereof included in the set conditions can be set by a technician according to a specific scene, and a solution for determining the current orientation in the electronic device may be adjusted to determine according to the included conditions, corresponding solution of which falls within the protection scope of the present application as well.

In step 103, if the current orientation satisfies the set condition, a display screen of the electronic device is controlled to display a prompt message, which is used to prompt the target object to adjust the current orientation, so that the adjusted orientation does not satisfy the set condition. If the current orientation does not satisfy the set condition, a display parameter of the viewing frame is to be adjusted. The adjusted display parameter is used to indicate that photographing is allowed.

In this embodiment, when it is determined that the current orientation satisfies one of the set conditions, a processor of the electronic device controls the display to display a prompt message. The prompt message may be used to prompt the target object to adjust the current orientation, so that the adjusted orientation does not satisfy the set condition (i.e. photographing is allowed). For example, when the current orientation satisfies the condition that the target object is not able to be recognized, the prompt message may be "the target object is not able to be recognized in the current situation, and please adjust the angle". When the current orientation satisfies the condition that the number of the objects exceeds a number threshold, the prompt message may be "the number of the objects in the viewing frame exceeds the number threshold, and please leave one of the objects (one can be adjusted)". When the current orientation satisfies the condition that the object is deflected to left, the prompt message can be "Please deflect to right", and so on. It can be seen that, in the embodiment, the prompt message may guide the target object to adjust the orientation to a photographing-allowed state as soon as possible. Through the above guidance, the target object can be adjusted as soon as possible to an orientation that does not satisfy the set conditions.

In this embodiment, after determining that the current orientation does not satisfy the set condition, the electronic device may adjust a display parameter of the viewing frame, which may include a color or a shape.

As an example that the display parameter includes color, adjusting the display parameter of the viewing frame may include adjusting a color value of the display parameter from a current color to a target color. For example, the current color is white and the target color is blue.

As an example that the display parameter includes shape, adjusting the display parameter of the viewing frame may include adjusting the display parameter from a current shape to a target shape. For example, the current shape is a fixed shape, and the target shape is a shape that can vary with a face of a target object.

Certainly, the display parameter may further include, for example, a thick line, a solid line or a broken line of a border. For example, the line of the border is thinner before adjustment, and is thicker after adjustment. For example, the line of the border is a broken line before adjustment, and is a solid line after adjustment. The said solutions can also achieve corresponding effects, and the corresponding solutions fall within the scope of protection of the present application.

In an embodiment, after determining that the current orientation does not satisfy the set condition, a processor of the electronic device may further control the display screen to display a prompt message of "please press the photographing button".

In step 104, in response to the photographing button on the electronic device being triggered, a target virtual image is loaded to the region where the viewing frame is located, and a target image is acquired after a portion of the target object which is located in the viewing frame has been replaced by the target virtual image.

In practical applications, the photographing button may be remained in a trigger valid state. It should be noted that, in this embodiment, the photographing button may be preset to be in a trigger invalid state, and after determining that the current orientation does not satisfy the set condition, the photographing button is adjusted from the trigger invalid state to the trigger valid state.

Figure 9:
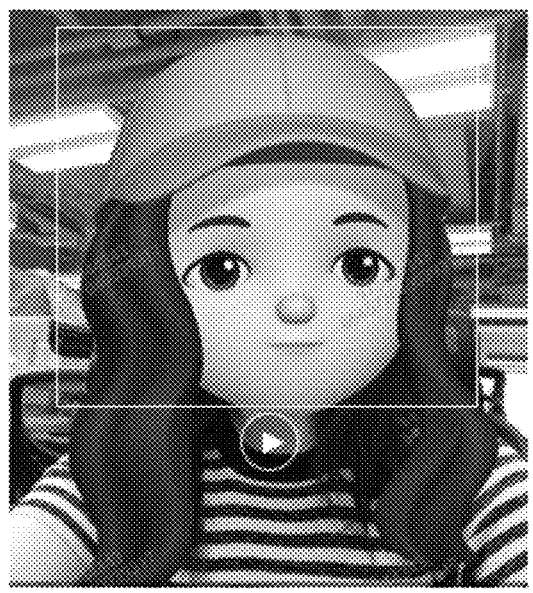
FIG. 9 is a schematic diagram showing an image processing effect according to some embodiments.

In this embodiment, the processor of the electronic device may monitor the photographing button. After monitoring that the photographing button is triggered, the target virtual image may be loaded to the region where the viewing frame is located in response to the photographing button being triggered, and a target image is acquired after a portion of the object which is located in the viewing frame has been replaced by the target virtual image. The target virtual image may comprise a cartoon character. As an example that the target virtual image is a cartoon character, referring to FIG. 9, a target virtual image in a white line frame is a cartoon image. The cartoon image may replace the head of the target object in the viewing frame (not shown), so that a cartoon character comprising a human body combined with a cartoon image as a head may be acquired.

As such, in various embodiments of the present disclosure, in response to the target object entering the viewing frame of the electronic device, the current orientation of the target object is to be determined, wherein the current orientation comprises a set condition indicating that it is does not satisfy a photographing requirement; then, in response to the current orientation not satisfying the set condition, display parameters of the viewing frame are adjusted, wherein the adjusted display parameters are used to indicate that photographing is allowed; and thereafter, in response to a photographing button of the electronic device being triggered, a target virtual image is loaded to the region where the viewing frame is located, and the target image is acquired after a portion of the target object located in the viewing frame is replaced by the target virtual image. In this way, in the embodiment, a photographer is able to photograph correctly based on the current orientation of the target, which is beneficial for the photographer to improve quality of photographing and improving photographing experience.

Figure 10:
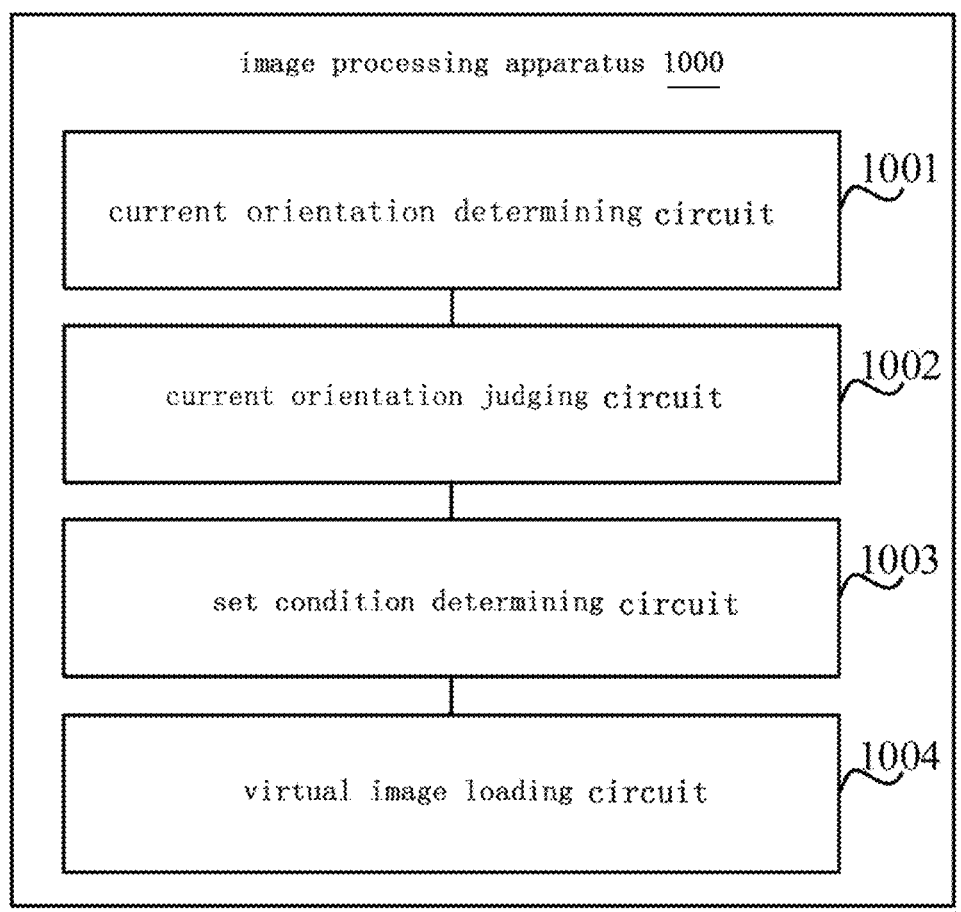
FIG. 10 is a first block diagram showing an image processing apparatus according to some embodiments.

FIG. 10 is a block diagram of an image processing apparatus according to an embodiment of the present disclosure. Referring to FIG. 10, an image processing apparatus 1000 comprises:

a current orientation determining circuit 1001, configured to determine a current orientation of a target object in response to the target object entering a viewing frame of the electronic device;

a current orientation judging circuit 1002, configured to judge whether the current orientation satisfies a set condition which is that the target orientation does not satisfy a photographing requirement;

a set condition determining circuit 1003, configured to control a display of the electronic device to display a prompt message when the current orientation satisfies the set condition, wherein the prompt message is used to prompt the target object to adjust the current orientation, so that the adjusted orientation does not satisfy the set condition; and adjust a display parameter of the viewing frame when the current orientation does not satisfy the set condition; and the adjusted display parameter is used to indicate that photographing is allowed;

a virtual image loading circuit 1004, configured to load a target virtual image to a region where the viewing frame is located in response to a photographing button on the electronic device being triggered, so as to acquire a target image after a portion of the target object which is located in the viewing frame has been replaced by the target virtual image.

Figure 11:
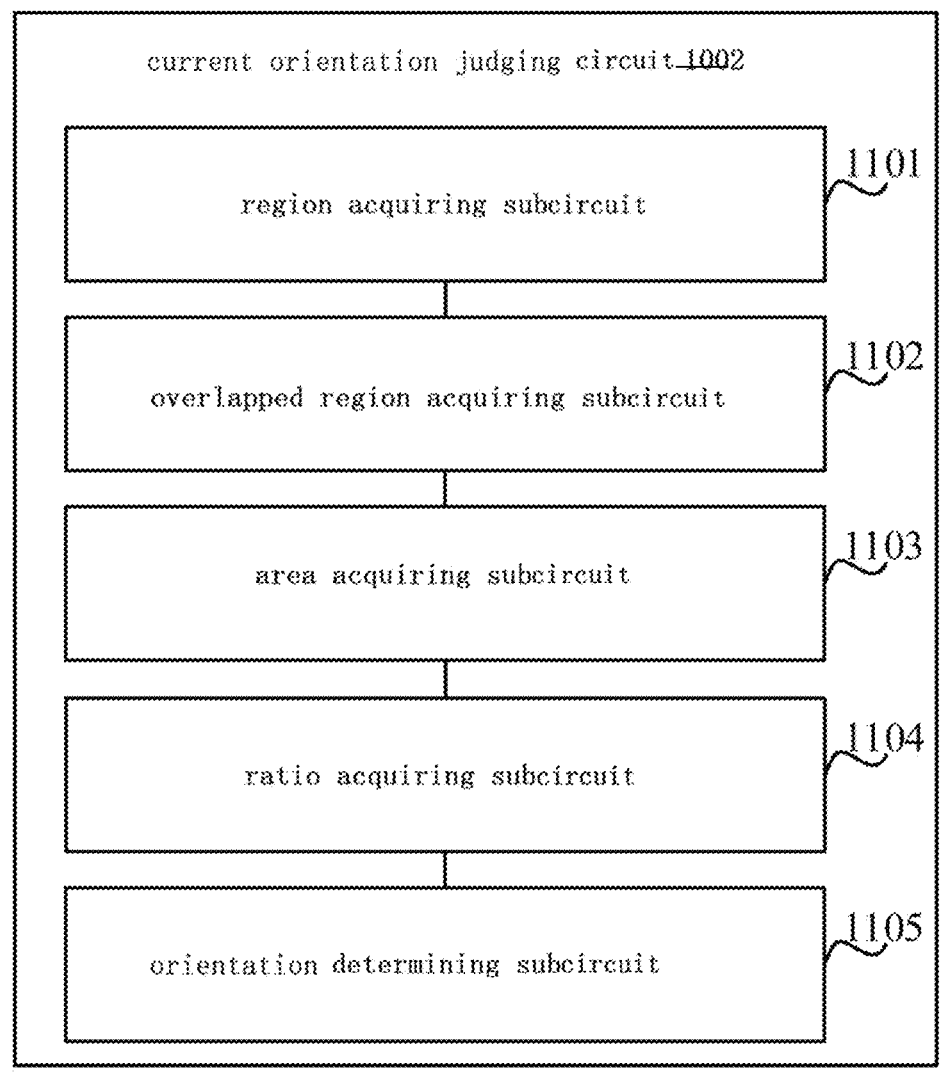
FIG. 11 is a second block diagram showing an image processing apparatus according to some embodiments.

FIG. 11 is a block diagram of an image processing apparatus according to an embodiment of the present disclosure. On basis of the image processing apparatus 1000 shown in FIG. 10, referring to FIG. 11, the set condition includes that a distance is smaller than a first distance threshold or a distance is greater than a second distance threshold; and the current orientation judging circuit 1002 comprises:

a region acquiring subcircuit 1101, configured to acquire a first region where a specified portion of the target object is located and a second region where the viewing frame is located;

an overlapped region acquiring subcircuit 1102, configured to acquire an overlapped region of the first region and the second region;

an area acquiring subcircuit 1103, configured to acquire a first area of the overlapped region and a second area of the second region;

a ratio acquiring subcircuit 1104, configured to acquire a ratio of the first area to the second area;

an orientation determining subcircuit 1105, configured to determine that the current orientation of the target object satisfies the condition that the distance is greater than the second distance threshold when the ratio is greater than the maximum value of a preset ratio range; to determine that the current orientation of the target object satisfies the condition that the distance is less than the first distance threshold when the ratio is smaller than the minimum value of the ratio range; and to determine that the current orientation does not satisfy the set condition when the ratio is within the ratio range.

Figure 12:
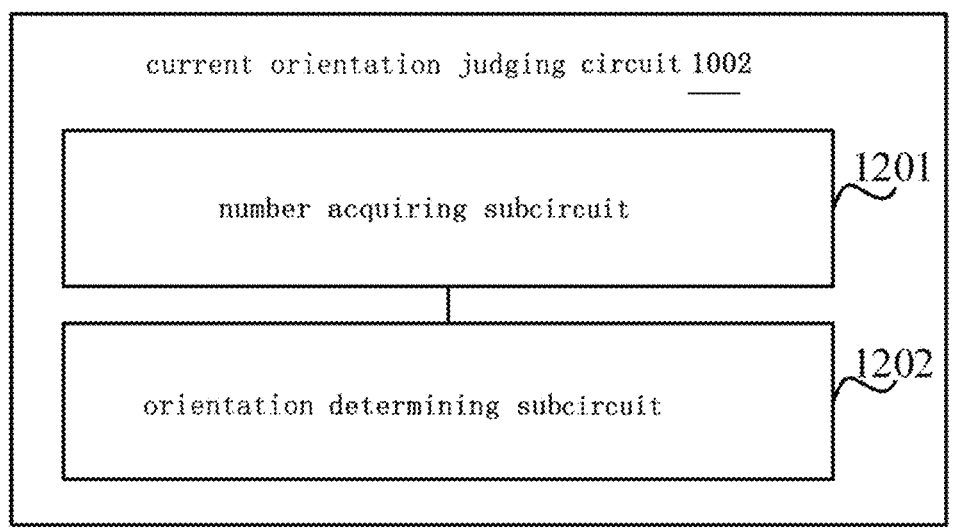
FIG. 12 is a third block diagram showing an image processing apparatus according to some embodiments.

FIG. 12 is a block diagram of an image processing apparatus according to an embodiment of the present disclosure. On basis of the image processing apparatus 1000 shown in FIG. 10, referring to FIG. 12, the set condition includes that the number of target objects exceeds a threshold, and the current orientation judging circuit 1002 comprises:

a number acquiring subcircuit 1201, configured to acquire acquiring the number of target objects in the viewing frame;

an orientation determining subcircuit 1202, configured to determine that the current orientation satisfies the set condition when the number is greater than a preset number threshold; and to determine that the current orientation does not satisfy the set condition when the number is less than or equal to the number threshold.

Figure 13:
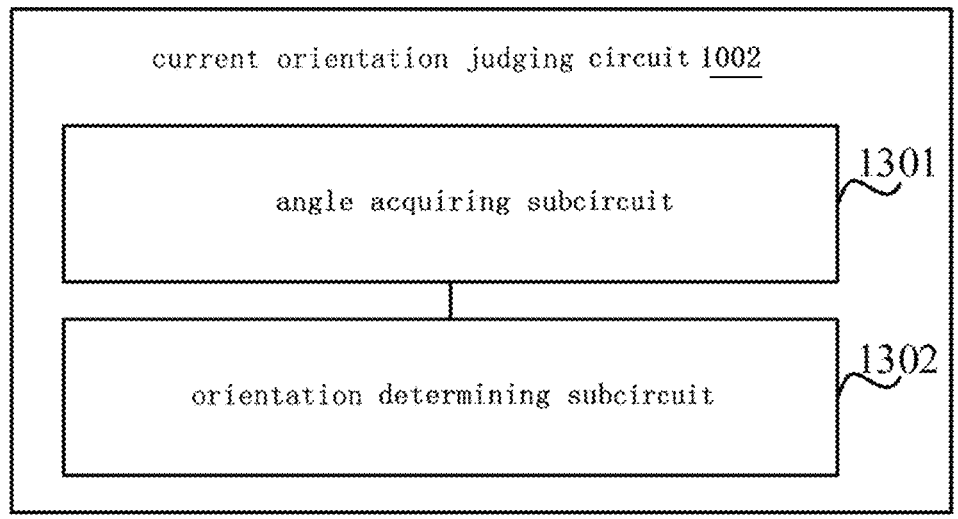
FIG. 13 is a fourth block diagram showing an image processing apparatus according to some embodiments.

FIG. 13 is a block diagram of an image processing apparatus according to an embodiment of the present disclosure. On basis of the image processing apparatus 1000 shown in FIG. 10, referring to FIG. 13, the set condition includes that the object is deflected to left or the object is deflected to right. The current orientation judging circuit 1002 comprises:

an angle acquiring subcircuit 1301, configured to acquire an angle included between a plane where a specified portion on the target object is located and a plane where the display screen on the electronic device is located;

an orientation determining subcircuit 1302, configured to determine that the current orientation satisfies the condition that the object is deflected to left when the angle is less than a minimum value of the preset angle range; to determine that the current orientation satisfies the condition that the object is deflected to right when the angle is greater than a maximum value of the preset angle range; and to determine that the current orientation does not satisfy the set condition if the angle is within the angle range.

Figure 14:
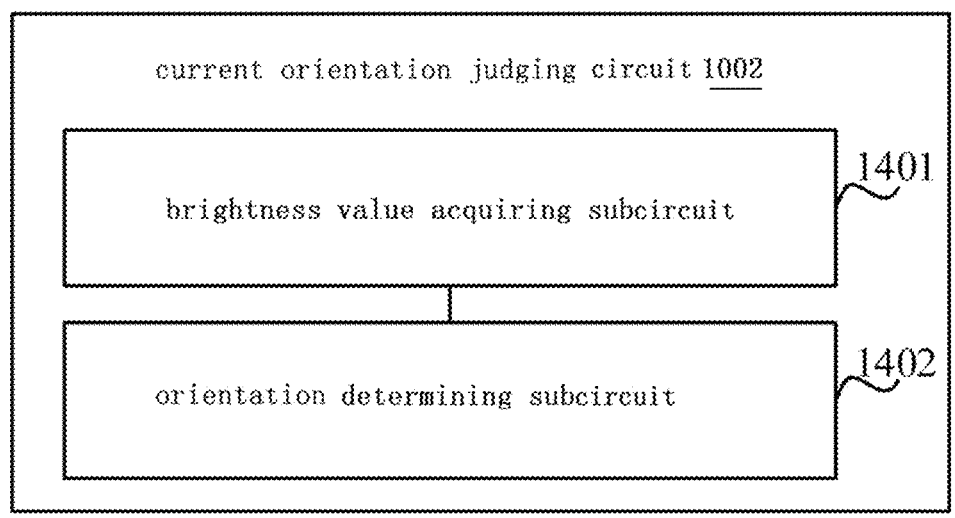
FIG. 14 is a fifth block diagram showing an image processing apparatus according to some embodiments.

FIG. 14 is a block diagram of an image processing apparatus according to an embodiment of the present disclosure. On basis of the image processing apparatus 1000 shown in FIG. 10, referring to FIG. 14, the set condition comprises that brightness is relatively low or high. The current orientation judging circuit 1002 comprises:

a brightness value acquiring subcircuit 1401, configured to acquire a current brightness value of the target object;

an orientation determining subcircuit 1402, configured to determine that the current orientation satisfies the condition that the brightness is relatively high when the brightness value is greater than a maximum value of a preset brightness range; to determine that the current orientation satisfies the condition that the brightness is relatively low when the brightness value is less than a minimum value of the preset brightness range; and to determine that the current orientation does not satisfy the set condition if the brightness value is within the brightness range.

Figure 15:
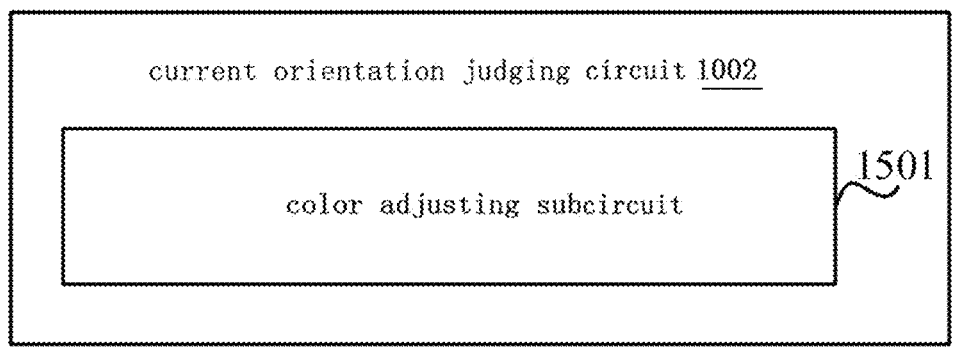
FIG. 15 is a sixth block diagram showing an image processing apparatus according to some embodiments.

FIG. 15 is a block diagram of an image processing apparatus according to an embodiment of the present disclosure. On basis of the image processing apparatus 1000 shown in FIG. 10, referring to FIG. 15, the display parameter includes a color, and the current orientation judging circuit 1002 comprises:

a color adjusting subcircuit 1501, configured to adjust a color value of the display parameter from a current color to a target color.

Figure 16:
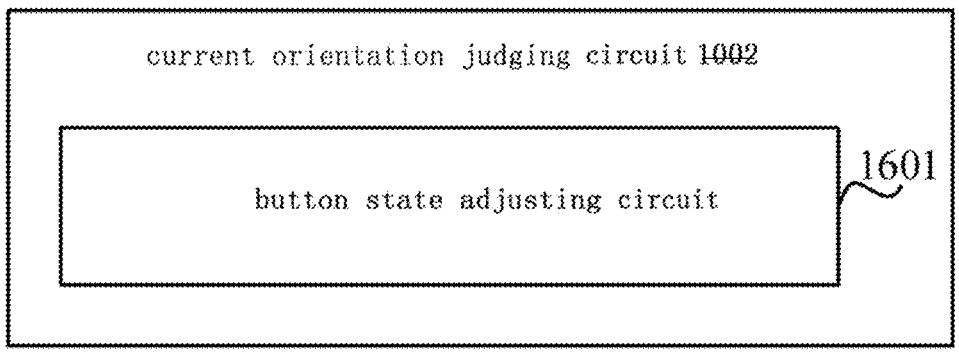
FIG. 16 is a seventh block diagram showing an image processing apparatus according to some embodiments.

FIG. 16 is a block diagram of an image processing apparatus according to an embodiment of the present disclosure. On basis of the image processing apparatus 1000 shown in FIG. 10, referring to FIG. 16, the apparatus 1000 further comprises:

a button state adjusting circuit 1601, configured to adjust a photographing button from a trigger invalid state to a trigger valid state.

Preferably, the target virtual image is a preset cartoon image.

It is appreciated that the image processing apparatuses provided by the embodiments of the present disclosure are corresponding to the image processing methods described above, embodiments of which may be referred to for detail content, and details are not described herein repeatedly.

So far, in embodiments of the present disclosure, in response to the target object entering the viewing frame of the electronic device, the current orientation of the target object is to be determined, wherein the current orientation comprises a set condition indicating that it does not satisfy a photographing requirement; then, in response to the current orientation not satisfying the set condition, display parameters of the viewing frame are adjusted; the adjusted display parameters are used to indicate that photographing is allowed; and thereafter, in response to a photographing button of the electronic device being triggered, a target virtual image is loaded to the region where the viewing frame is located, and the target image is acquired after a portion of the target object located in the viewing frame is replaced by the target virtual image. In this way, in the embodiment, a photographer is able to photograph correctly based on the current orientation of the target, which is beneficial for the photographer to improve quality of photographing and improving photographing experience.

Figure 17:
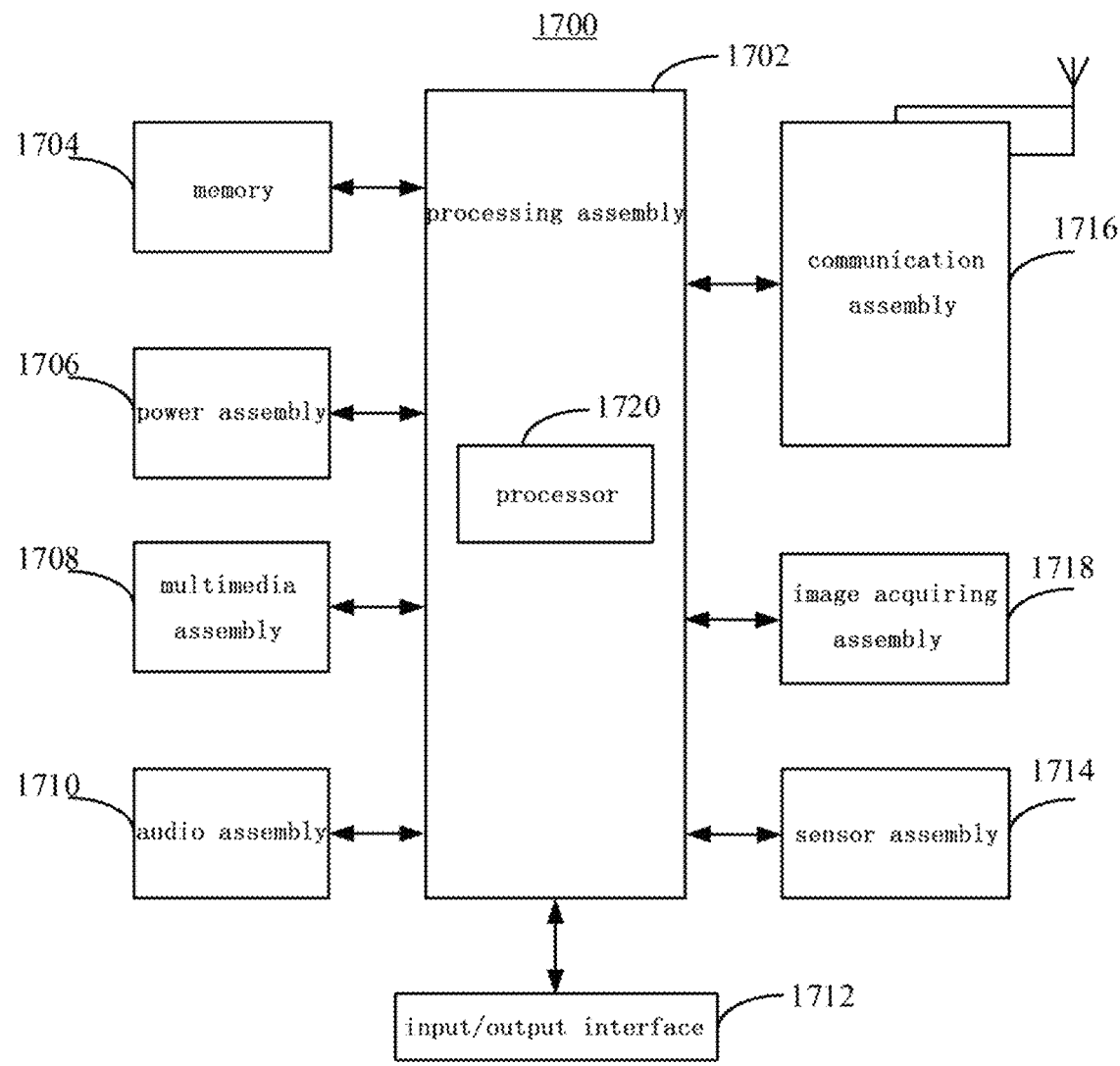
FIG. 17 is a block diagram showing an electronic device according to some embodiments.

FIG. 17 is a block diagram of an electronic device according to some embodiments. For example, the electronic device 1700 may be a smart phone, a computer, a digital broadcast terminal, a tablet device, a medical device, a fitness device, a personal digital assistant, and the like.

Referring to FIG. 17, the electronic device 1700 may include one or more of the following assemblies: a processing assembly 1702, a memory 1704, a power assembly 1706, a multimedia assembly 1708, an audio assembly 1710, an input/output (I/O) interface 1712, a sensor assembly 1714, a communication assembly 1716, and an image acquiring assembly 1718.

The processing assembly 1702 typically controls an overall operation of the electronic device 1700, such as an operation associated with display, telephone calls, data communications, camera operations, and recording operations. The processing assembly 1702 may comprise one or more processors 1720 to execute instructions. Moreover, the processing assembly 1702 may include one or more circuits to facilitate interaction between the processing assembly 1702 and other assemblies. For example, the processing assembly 1702 may include a multimedia circuit to facilitate interaction between the multimedia assembly 1708 and the processing assembly 1702. When an interaction is executed, the processor 1720 may read an executable instruction from the memory 1704, so as to implement steps of methods shown in FIG. 1 to FIG. 9.

The memory 1704 is configured to store various types of data to support operations at the electronic device 1700. Examples of such data include instructions for any application or method operating on the electronic device 1700, contact data, phone book data, messages, pictures, videos, and the like. The memory 1704 may be implemented by any type of volatile or non-volatile storage apparatus, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power assembly 1706 provides power to various assemblies of the electronic device 1700. The power assembly 1706 may comprise a power management system, one or more power sources, and other assemblies associated with generating, managing, and distributing power for electronic device 1700.

The multimedia assembly 1708 includes a screen that provides an output interface between the electronic device 1700 and a target object. In some embodiments, the screen may include a liquid crystal display (LCD) and a touch panel (TP). If the screen includes a touch panel, the screen may be implemented as a touch screen to receive input signals from the target object. The touch panel includes one or more touch sensors to sense touches, slides, and gestures on the touch panel. The touch sensor may sense not only a boundary of a touch or a sliding action, but also duration and pressure associated with the touch or sliding action.

The audio assembly 1710 is configured to output and/or input an audio signal. For example, the audio assembly 1710 includes a microphone (MIC) that is configured to receive an external audio signal when the electronic device 1700 is in an operational mode, such as a call mode, a recording mode, and a voice recognition mode. The received audio signal may be further stored in the memory 1704 or transmitted via the communication assembly 1716. In some embodiments, the audio assembly 1710 further includes a speaker for outputting an audio signal. The speaker can be configured to provide an audio signal to prompt the target, in addition to/instead of displaying the prompt message.

The I/O interface 1712 provides an interface between the processing assembly 1702 and a peripheral interface circuit, which may be a keyboard, a click wheel, buttons, or the like.

The sensor assembly 1714 includes one or more sensors for providing the electronic device 1700 with a status assessment in various aspects. For example, the sensor assembly 1714 may detect an on/off state of the electronic device 1700, a relative positioning of assemblies, such as the display screen and the keypad of the electronic device 1700; and the sensor assembly 1714 may also detect change of a position of the electronic device 1700 or an assembly of the electronic device 1700, presence or absence of contacting of the target object with the electronic device 1700, an orientation or acceleration/deceleration of the electronic device 1700, and temperature change of the electronic device 1700.

The communication assembly 1716 is configured to facilitate wired or wireless communication between the electronic device 1700 and other apparatus. The electronic device 1700 is able to access a wireless network based on a communication standard such as Wi-Fi, 2G/3G/4G/5G, or a combination thereof. In some embodiments, the communication assembly 1716 receives broadcast signals or broadcast associated information from an external broadcast management system via a broadcast channel. In some embodiments, the communication assembly 1716 further includes a near field communication (NFC) circuit to facilitate short range communication. For example, the NFC circuit can be implemented based on radio frequency identification (RFID) technology, infrared data association (IrDA) technology, ultra-wideband (UWB) technology, Bluetooth (BT) technology, and other technologies.

In some embodiments, the electronic device 1700 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic assemblies.

In exemplary embodiments, there is also provided a non-transitory computer-readable storage medium including instructions, such as included in the memory 1704, executable by the processor 1720 in the electronic device 1700, for performing the above-described methods. For example, the non-transitory computer-readable storage medium may be a ROM, a Random-Access Memory (RAM), a CD-ROM, a magnetic tape, a floppy disc, an optical data storage device, and the like.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An image processing method, which is applicable to an electronic device, the method comprising:

determining a current orientation of a target object in response to the target object entering a viewing frame of the electronic device;

judging whether the current orientation satisfies a set condition which is that a target orientation does not satisfy a photographing requirement;

controlling a display screen of the electronic device to display a prompt message if the current orientation satisfies the set condition, wherein the prompt message is used to prompt the target object to adjust the current orientation, so that the adjusted orientation does not satisfy the set condition;

adjusting a display parameter of the viewing frame if the current orientation does not satisfy the set condition, wherein the adjusted display parameter is used to indicate that photographing is allowed; and loading a target virtual image to a region where the viewing frame is located in response to a photographing button on the electronic device being triggered, so as to acquire a target image after a portion of the target object located in the viewing frame has been replaced by the target virtual image;

wherein the set condition comprises: a distance is less than a first distance threshold or a distance is greater than a second distance threshold; and step of judging whether the current orientation satisfies the set condition comprises:

acquiring a first region where a specified part of the target object is located and a second region where the viewing frame is located;

acquiring an overlapped region of the first region and the second region;

acquiring a first area of the overlapped region and a second area of the second region;

acquiring a ratio of the first area to the second area; and determining that the current orientation of the target object satisfies the set condition which is that the distance is greater than the second distance threshold, if the ratio is greater than a maximum value of a preset ratio range; determining that the current orientation of the target object satisfies the set condition which is that the distance is less than the first distance threshold, if the ratio is less than a minimum value of the ratio range; and determining that the current orientation does not satisfy the set condition, if the ratio is within the ratio range.

2. The image processing method according to claim 1, wherein the display parameter comprises a color, and step of adjusting the display parameter of the viewing frame comprises:

adjusting a color value of the display parameter from a current color to a target color.

3. The image processing method according to claim 1, wherein before in response to the photographing button on the electronic device being triggered, the method further comprises:

adjusting the photographing button from a trigger invalid state to a trigger valid state.

4. The image processing method according to claim 1, wherein the target virtual image is a preset cartoon image.

5. An electronic device implementing the method of claim 1, comprising:

a processor; and a memory for storing instructions executable by the processor;

wherein the processor is configured to execute the executable instructions in the memory to implement steps of the method.

6. The electronic device of claim 5, further comprising one or more cameras, and a display screen.

7. The electronic device of claim further comprising a speaker configured to provide an audio signal prompt message to the target to adjust the current orientation.

8. An image processing apparatus, which is applicable to an electronic device, the apparatus comprising:
- a current orientation determining circuit, configured to determine a current orientation of a target object in response to the target object entering a viewing frame of the electronic device;
- a current orientation judging circuit, configured to judge whether the current orientation satisfies a set condition that the target orientation does not satisfy a photographing requirement;
- a set condition determining circuit, configured to control a display screen of the electronic device to display a prompt message when the current orientation satisfies the set condition, wherein the prompt message is used to prompt the target object to adjust the current orientation, so that the adjusted orientation does not satisfy the set condition; and configured to adjust a display parameter of the viewing frame when the current orientation does not satisfy the set condition, wherein the adjusted display parameter is used to indicate that photographing is allowed; and
- a virtual image loading circuit, configured to load a target virtual image to a region where the viewing frame is located in response to a photographing button on the electronic device being triggered, so as to acquire a target image after a portion of the target object located in the viewing frame has been replaced by the target virtual image;
- wherein the set condition comprises: a distance is less than a first distance threshold or a distance is greater than a second distance threshold; the current orientation judging circuit comprises:
  - a region acquiring subcircuit, configured to acquire a first region where a specified part of the target object is located and a second region where the viewing frame is located;
  - an overlapped region acquiring subcircuit, configured to acquire an overlapped region of the first region and the second region;
  - an area acquiring subcircuit, configured to acquire a first area of the overlapped region and a second area of the second region;
  - a ratio acquiring subcircuit, configured to acquire a ratio of the first area to the second area; and
  - an orientation determining subcircuit, configured to determine that the current orientation of the target object satisfies the set condition that the distance is greater than the second distance threshold when the ratio is greater than the maximum value of the preset ratio range; to determine that the current orientation of the target object satisfies the distance is less than the first distance threshold when the ratio is smaller than the minimum value of the ratio range; and configured to determine that the current orientation does not satisfy the set condition when the ratio is within the ratio range.

9. The image processing apparatus according to claim 8, wherein the display parameter comprises a color, and the current orientation determining circuit comprises:
- a color adjusting subcircuit, configured to adjust a color value of the display parameter from a current color to a target color.

10. The image processing apparatus according to claim 8, wherein the apparatus further comprises:
- a button state adjusting circuit, configured to adjust a photographing button from a trigger invalid state to a trigger valid state.

11. The image processing apparatus according to claim 8, wherein the target virtual image is a preset cartoon image.

* * * * *